US009598959B2

(12) United States Patent
Frem

(10) Patent No.: US 9,598,959 B2
(45) Date of Patent: Mar. 21, 2017

(54) FLUID EXPANSION ENGINE

(71) Applicant: Neemat Frem, Jounieh (LB)

(72) Inventor: Neemat Frem, Jounieh (LB)

(*) Notice: Subject to any disclaimer, the term of this patent is extended or adjusted under 35 U.S.C. 154(b) by 212 days.

(21) Appl. No.: 14/287,313

(22) Filed: May 27, 2014

(65) Prior Publication Data

US 2014/0345269 A1     Nov. 27, 2014

(30) Foreign Application Priority Data

May 27, 2013    (EP) ..................................... 13169300

(51) Int. Cl.
    *F02G 1/044*       (2006.01)
    *F01C 17/04*       (2006.01)
               (Continued)

(52) U.S. Cl.
    CPC ................ *F01C 17/04* (2013.01); *F01B 1/06* (2013.01); *F01B 1/061* (2013.01); *F01B 1/062* (2013.01); *F01B 13/06* (2013.01); *F01B 13/068* (2013.01); *F02G 1/044* (2013.01); *F02G 1/055* (2013.01); *F03G 6/04* (2013.01); *F03G 6/068* (2013.01);
               (Continued)

(58) Field of Classification Search
    CPC .. F02B 57/08; F02G 2243/30–2243/38; F02G 2270/42; F02G 2270/30; F02G 2270/425; F02G 2270/40; F02G 1/044; F02G 2244/08; F01B 13/06; F01B 13/068; F01B 1/062–1/0637
    See application file for complete search history.

(56) References Cited

U.S. PATENT DOCUMENTS 751,694 A * 2/1904 Shearer ................. F01B 1/0624
                                                               74/580
1,300,916 A * 4/1919 Beach ..................... F02B 57/08
                                                           123/44 C
(Continued)

FOREIGN PATENT DOCUMENTS

BE            523269 A      4/1954
DE     102004059928 A1      6/2006

OTHER PUBLICATIONS

EP Search Report from corresponding EP Application No. 13169300, Jul. 31, 2013.

*Primary Examiner* — Thomas Denion
*Assistant Examiner* — Xiaoting Hu
(74) *Attorney, Agent, or Firm* — Workman Nydegger

(57) ABSTRACT

A hot fluid expansion engine has a plurality of actuator modules arranged in a star configuration around a central shaft. Each module includes a drive piston defining a working chamber of variable volume in the first enclosure; a movable displacement piston subdividing a second enclosure into a low temperature chamber of variable volume and a high temperature chamber of variable volume with the high temperature chamber communicating with a unit of a fluid heater device and the low temperature chamber communicating with the working chamber; and a fluid circulation circuit extending between the fluid heater device and the working chamber. The drive piston and the displacement piston of each actuator module are connected to the central shaft via respective first and second eccentric transmission devices suitable for imparting reciprocating motion in translation to each of the pistons with a phase lag of 90°.

15 Claims, 16 Drawing Sheets

(51) Int. Cl.
   *F03G 6/06*    (2006.01)
   *F03G 6/04*    (2006.01)
   *F01B 13/06*   (2006.01)
   *F01B 1/06*    (2006.01)
   *F02G 1/055*   (2006.01)
   *F01B 9/06*    (2006.01)
   *F01B 9/02*    (2006.01)

(52) U.S. Cl.
   CPC ........... *F01B 9/02* (2013.01); *F01B 2009/061* (2013.01); *F02G 2243/30* (2013.01); *F02G 2243/32* (2013.01); *F02G 2254/10* (2013.01); *F02G 2254/30* (2013.01); *F02G 2254/45* (2013.01); *F02G 2256/02* (2013.01); *F02G 2270/30* (2013.01); *F02G 2270/40* (2013.01); *F02G 2270/42* (2013.01)

(56) References Cited

U.S. PATENT DOCUMENTS

| | | | | |
|---|---|---|---|---|
| 1,316,346 | A * | 9/1919 | Augustine | F02B 57/08 123/44 C |
| 1,382,611 | A * | 6/1921 | Augustine | F02B 57/08 123/44 C |
| 3,477,415 | A * | 11/1969 | Hans | F02B 57/08 123/44 C |
| 3,657,877 | A * | 4/1972 | Huffman | F01K 25/00 60/526 |
| 3,857,371 | A * | 12/1974 | Gibson | F01B 13/068 123/44 D |
| 4,642,988 | A * | 2/1987 | Benson | F02G 1/0435 60/518 |
| 4,677,825 | A * | 7/1987 | Fellows | F02G 1/04 60/525 |
| 5,177,968 | A * | 1/1993 | Fellows | F01B 1/062 60/517 |
| 5,303,679 | A * | 4/1994 | Gamon | F01B 1/062 123/44 C |
| 5,390,496 | A * | 2/1995 | El Affaqui | F02G 1/044 60/517 |
| 5,735,123 | A | 4/1998 | Ehrig | |
| 5,884,481 | A | 3/1999 | Johansson et al. | |
| 2002/0124561 | A1 * | 9/2002 | Ban | F02G 1/043 60/517 |
| 2003/0226525 | A1 * | 12/2003 | Warren | F02G 1/04 123/65 R |
| 2004/0222636 | A1 | 11/2004 | Otting et al. | |
| 2012/0073298 | A1 * | 3/2012 | Frem | F01B 13/068 60/682 |
| 2012/0137671 | A1 | 6/2012 | Schliebe | |

* cited by examiner

FLUID EXPANSION ENGINE

BACKGROUND OF THE INVENTION

The present invention relates to the general field of rotary engines. The most common rotary engines are internal combustion engines rotating about a crankshaft that remains stationary. In such engines, the cylinders are arranged in a star configuration.

The main advantages of an engine of this type lie in low weight and a low level of vibration relative to an engine having stationary cylinders.

Nevertheless, at present, rotary engines are considered as being relatively polluting in that they have very high fuel consumption for rather low efficiency and in that they make use of internal or external combustion. Known rotary engines also require a very large quantity of oil in order to lubricate them.

There exists a need for non-polluting rotary engines that can be used in various types of environment (dwellings, industrial installations, etc.).

OBJECT AND SUMMARY OF THE INVENTION

An object of the present invention is to provide a novel rotary engine design that can be driven without requiring internal or external combustion.

This object is achieved by a hot fluid expansion engine comprising a central shaft and a plurality of actuator modules arranged in a star configuration around the central shaft, each module comprising:
  a drive piston movable in a first enclosure, the drive piston defining a working chamber of variable volume in said first enclosure; and
  a displacement piston movable in a second enclosure, the displacement piston separating a low temperature chamber of variable volume from a high temperature chamber of variable volume in said second enclosure, the low temperature chamber communicating with the working chamber;
  in which engine the drive piston and the displacement piston of each actuator module are connected to the central shaft via respective first and second eccentric transmission devices, each suitable for causing the corresponding piston to perform reciprocating motion in translation, the motion of the drive piston having a phase lag of 90° relative to the motion of the displacement piston;
  each module being driven in rotation about a central shaft so as to accelerate the cooling of the fluid in the working chamber;
  the engine further including a fluid heater device placed between the actuator modules, each high temperature chamber communicating with the fluid heater device and each working chamber being connected to said fluid heater device via a fluid circulation circuit, and the fluid circulation circuit of each actuator module includes a gas regenerator extending around the high temperature chamber.

The rotary engine of the invention is thus driven by varying the volume of the fluid present in each actuator module. Consequently, the engine of the invention pollutes very little in that it does not require internal or external combustion means in order to drive it and it therefore does not exhaust any combustion gas. The engine of the invention also requires little maintenance and it operates very silently.

In addition, each actuator module, and consequently the engine, presents a structure that is compact, in particular because of the presence of a fluid circulation circuit connecting the solar heater device to the working chamber of the drive piston.

Furthermore, in the engine of the invention, each actuator module, which operates on the principle of a Stirling engine, rotates continuously around the central shaft, thereby creating natural ventilation over the outer wall of the working chamber of the drive piston and accelerating cooling of the fluid at the end of the thermodynamic cycle. This improves the efficiency of the engine.

The fluid circulation circuit of each actuator module also has a gas regenerator extending around the high temperature chamber. Thus, the heat of the fluid flowing from the heater device to the working chamber can be captured and then restored while the fluid is flowing in the opposite direction, thereby enabling the efficiency of the engine to be improved.

In a first aspect of the invention, actuator module comprises a cylinder block having an internal housing corresponding to the working chamber of the drive piston, said cylinder block having cooling fins on its outside surface, thereby serving to further accelerate cooling of the fluid in the working chamber when the actuator module is in rotation.

In a second aspect of the invention, the fluid circulation circuit of each actuator module comprises a heat dissipater extending around the low temperature chamber, thereby accelerating cooling of the fluid going towards the working chamber.

In a third aspect of the invention, the fluid heater device comprises a plurality of collector unit each enclosing an array of channels extending between an inlet and an outlet, the inlet of each unit being connected to the high temperature chamber of the corresponding actuator module, and the outlet of said unit being connected to the fluid circulation circuit of said corresponding actuator module. This individualizes the heating of the fluid in each actuator module.

In a fourth aspect of the invention, the engine includes a solar radiation concentrator device suitable for concentrating solar rays on the collector unit of the fluid heater device.

In a fifth aspect of the invention, the engine includes heater means suitable for transmitting heat to the collector unit of the fluid heater device.

In a sixth aspect of the invention, in each actuator module, the drive piston and the displacement piston are arranged in adjacent manner in a common plane parallel to the axis of the central shaft. By means of this disposition, it is possible to minimize the size of each actuator module and make the engine more compact.

In a seventh aspect of the invention, each displacement piston is connected to a first end of a rocker via a guide rod, the second end of the rocker being connected to one end of a control rod, the opposite end of the control rod being connected to a cam follower mounted on a cam secured to the central shaft.

In an eighth aspect of the invention, each drive piston is connected to one end of a connecting rod, the opposite end of the connecting rod being connected to a head mounted on a crankpin of a crankshaft present on the central shaft.

In a ninth aspect of the invention, each actuator module contains a gaseous fluid selected from at least one of the following gaseous fluids: air, hydrogen, Freon, and helium.

BRIEF DESCRIPTION OF THE DRAWINGS

Other characteristics and advantages of the invention appear from the following description of particular embodiments of the invention given as non-limiting examples and with reference to the accompanying figures, in which.

DETAILED DESCRIPTION OF AN EMBODIMENT

Figure 1:
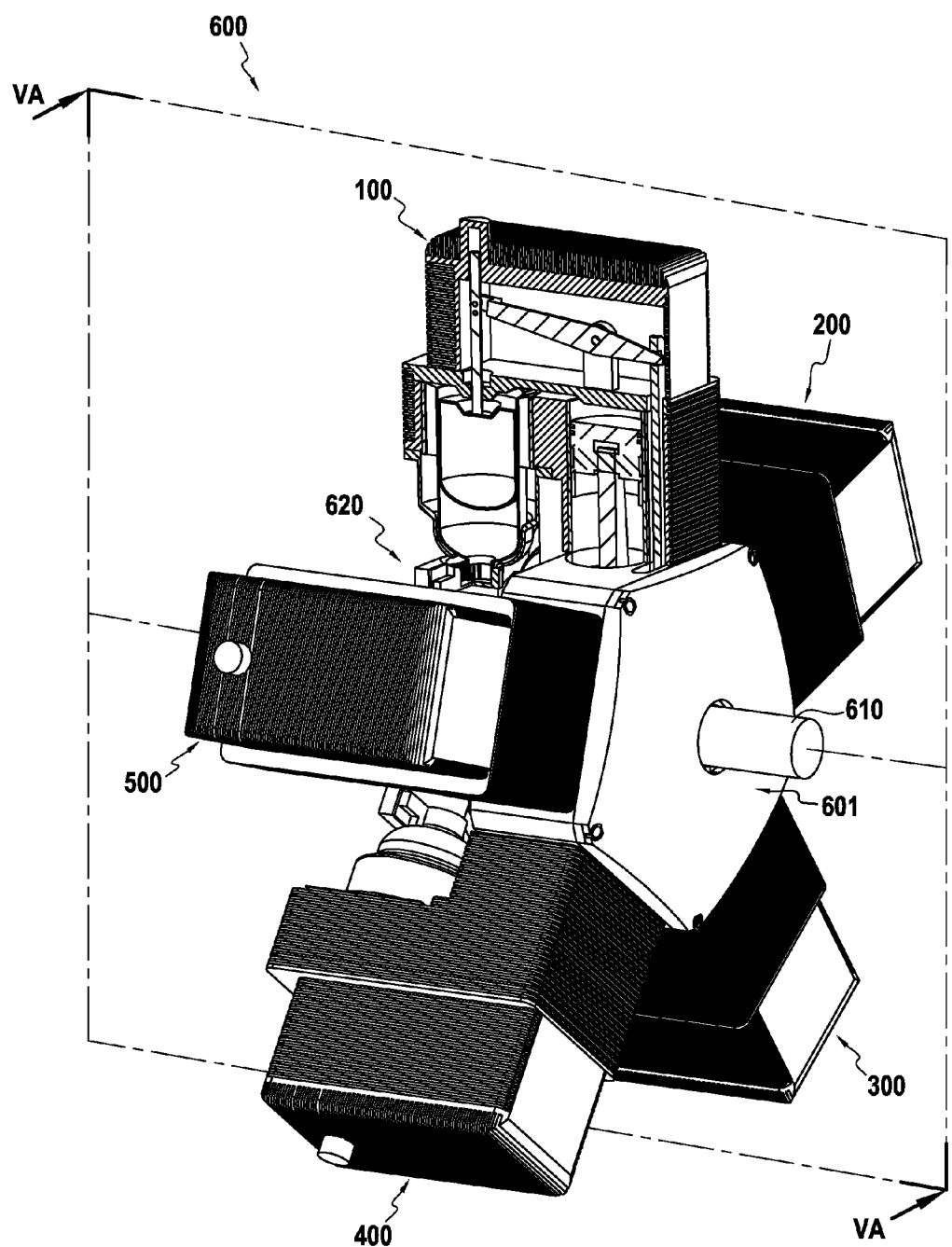
FIG. 1 is a perspective view of an embodiment of a solar fluid expansion engine in accordance with the invention.

FIG. 1 shows a fluid expansion engine 600 in accordance with an embodiment of the invention. In the presently-described embodiment, the engine has five actuator modules 100 to 500 arranged in a star configuration. As described in detail below, the movable portions of each actuator module are connected to a central shaft 610 inside an engine casing 601. The engine 600 also has a fluid heater device 620 that is also described in detail below.

Figure 2A:
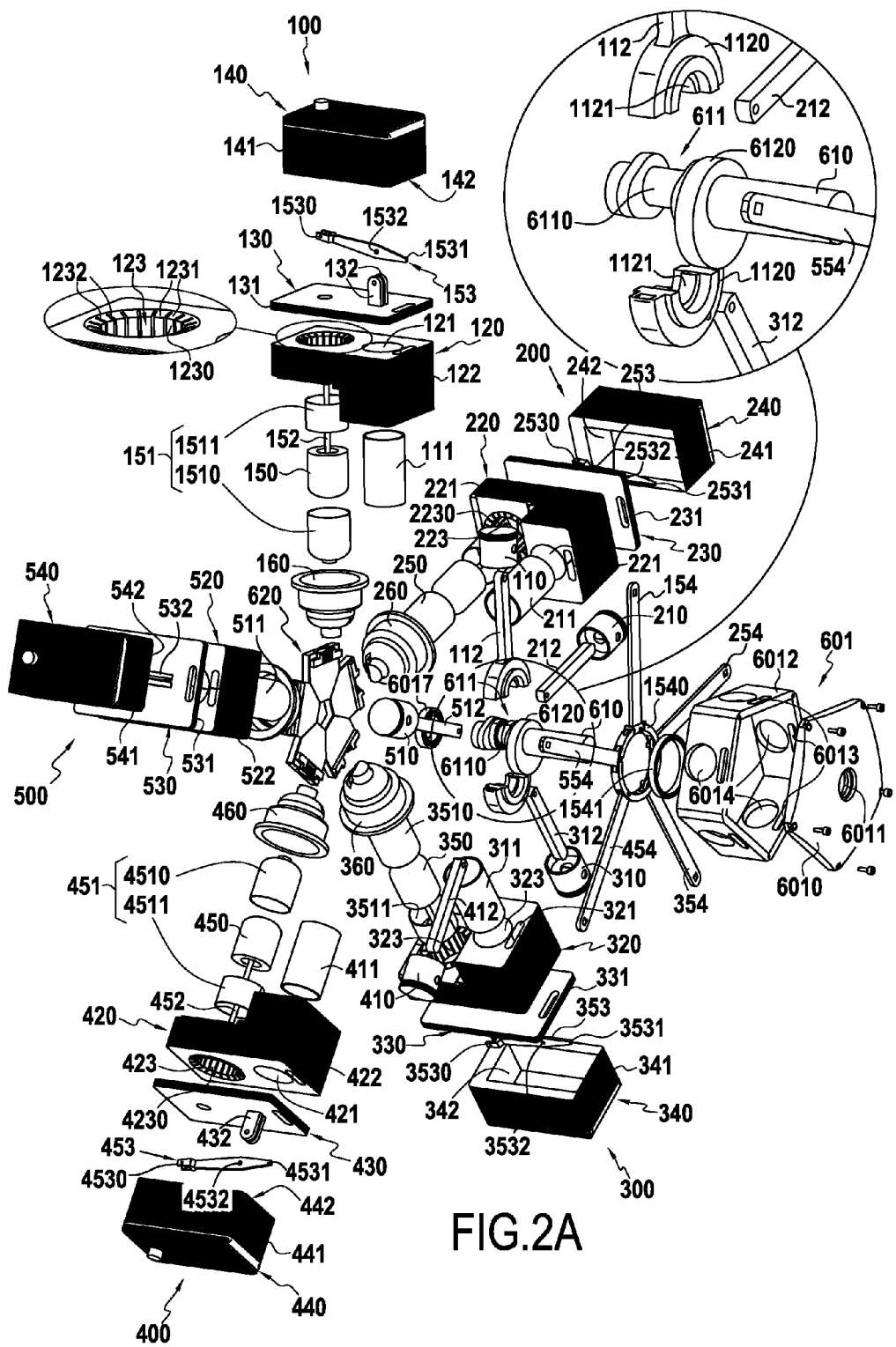
FIGS. 2A and 2B are exploded views of the FIG. 1 engine.
Figure 2B:
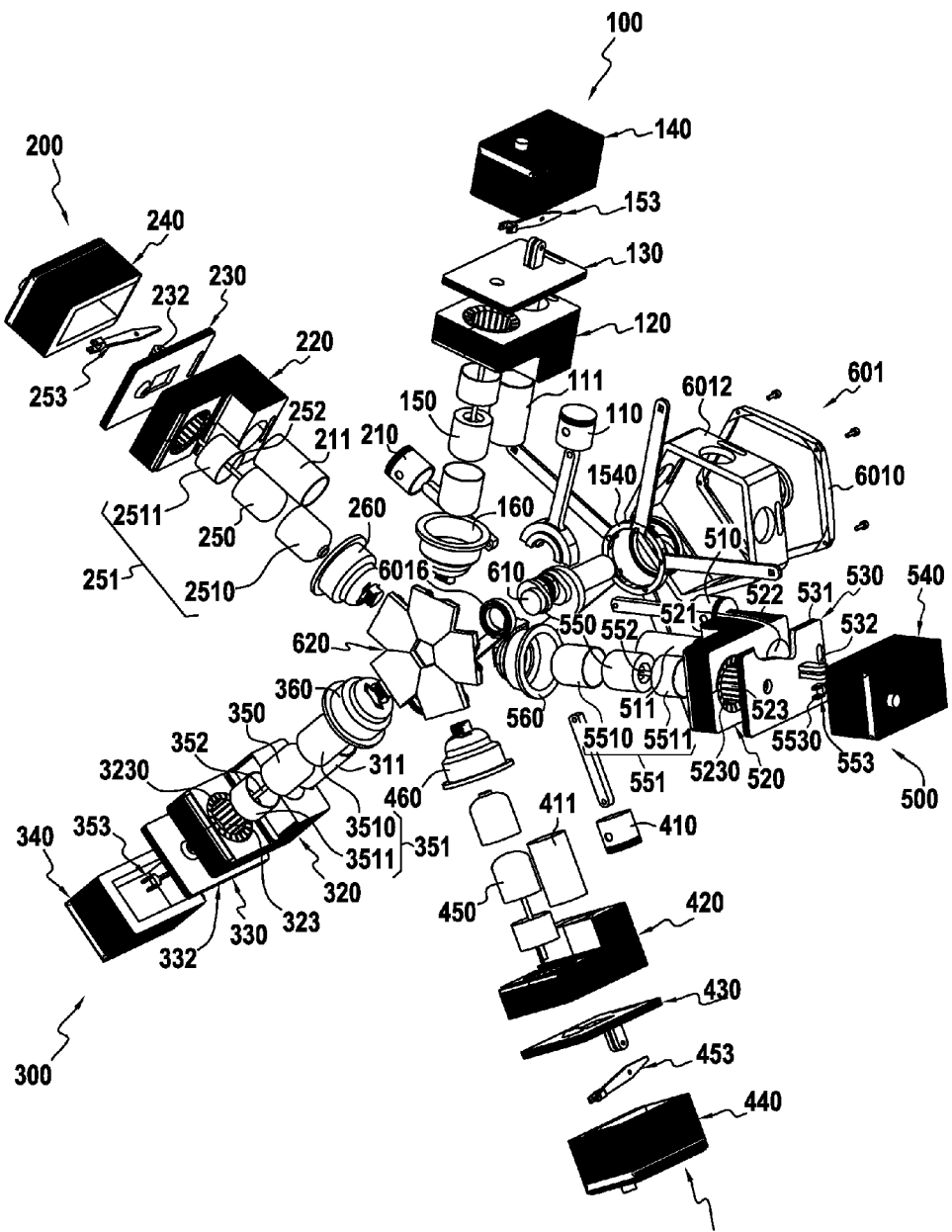
Figure 4A:
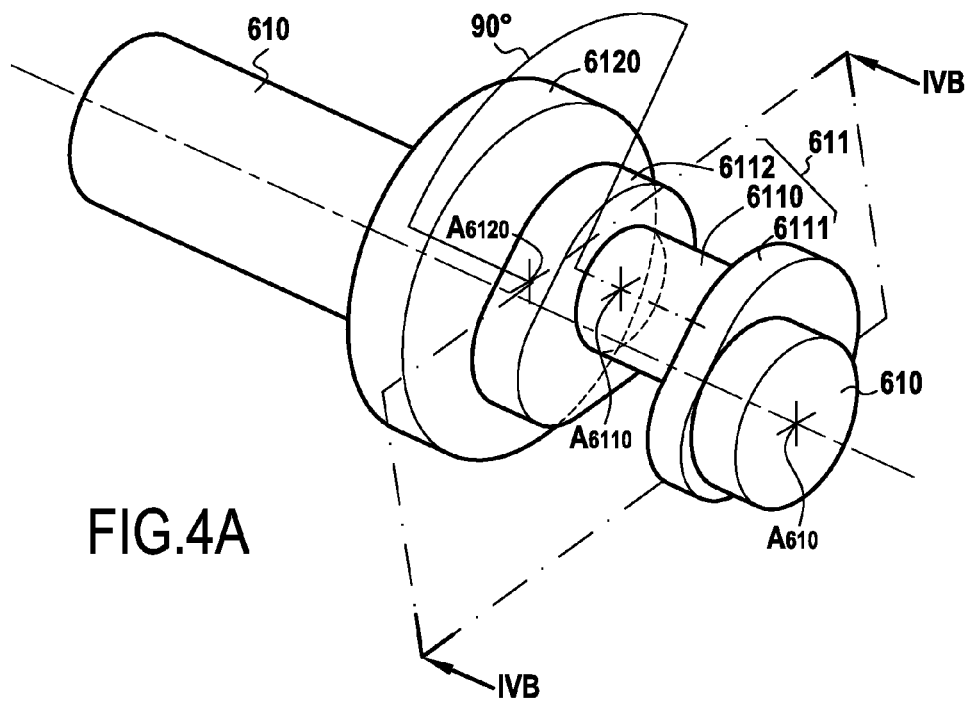
FIGS. 4A and 4B are respectively a perspective view and a section view of the shaft shown in FIGS. 2A and 2B.

As shown in FIGS. 2A and 2B, each actuator module 100, 200, 300, 400, or 500, includes a respective drive piston 110, 210, 310, 410, or 510. Each drive piston 110, 210, 310, 410, or 510 is movable in a respective jacket 111, 211, 311, 411, or 511 and is connected to a respective connecting rod 112, 212, 312, 412, or 512. The connecting rod 112 is a master connecting rod, and has a head 1120 at its end opposite from its end connected to the drive piston 110, which head has the other connecting rods 212, 312, 412, and 512 mounted thereon in hinged manner. The connecting rod head 1120 is mounted on a connecting rod bearing or crankpin 6110 of a crankshaft 611 present on the shaft 610, a rolling bearing 1121 being interposed between the crankpin 6110 and the connecting rod head 1120. The crankpin 6110 is held on the shaft 610 between two cheeks 6111 and 6112 (FIG. 4A).

Each jacket 111, 211, 311, 411, or 511 is fastened in a respective housing 121, 221, 321, 421, or 521 of a respective cylinder block 120, 220, 320, 420, or 520 having on its outside surface respective cooling fins 122, 222, 322, 422, or 522.

Each cylinder block 120, 220, 320, 420, or 520 is closed in its top portion by a respective plate 130, 230, 330, 430, or 530 having respective cooling fins 131, 231, 331, 431, or 531, and a respective cap 140, 240, 340, 440, or 540, likewise having respective cooling fins 141, 241, 341, 441, or 541.

Each actuator module 100, 200, 300, 400, or 500, also includes a respective displacement piston 150, 250, 350, 450, or 550. Each displacement piston 150, 250, 350, 450, or 550 is movable in a respective jacket 151, 251, 351, 451, or 551, each formed by uniting a respective pair of elements 1510/1511, 2510/2511, 3510/3511, 4510/4511, or 5510/5511. The element 1510, 2510, 3510, 4510, or 5510 of the respective jacket 151, 251, 351, 451, or 551 is housed in a respective cylinder casing 160, 260, 360, 460, or 560. The element 1511, 2511, 3511, 4511, or 5511 of each respective jacket 151, 251, 351, 451, or 551 is fastened in a respective housing 123, 223, 323, 423, or 523 of the respective cylinder block 120, 220, 320, 420, or 520. The housing 123, 223, 323, 423, or 523 includes a respective cooler device 1230, 2230, 3230, 4230, or 5230 constituted in this example by cooling fins. As shown for the housing 123 in FIG. 2A, the fins 1231 are defined by grooves 1232 formed in the housing 123. Similar grooves (not shown in FIGS. 2A and 2B) are likewise formed in the housings 223, 323, 423, and 523 for forming the similar cooling fins (not shown in FIGS. 2A and 2B) of the cooler devices 2230, 3230, 4230, and 5230.

Each displacement piston 150, 250, 350, 450, or 550 is connected to a respective control rod 152, 252, 352, 452, or 552, itself connected at a first end 1530, 2530, 3530, 4530, or 5530 to a respective rocker 153, 253, 353, 453, or 553. The second end 1531, 2531, 3531, 4531, or 5531 of the respective rocker 153, 253, 353, 453, or 553 is connected to a respective rocker rod 154, 254, 354, 454, or 554. Each rocker 153, 253, 353, 453, or 553 has a respective pin 1532, 2532, 3532, 4532, or 5532 mounted on a respective support 132, 232, 332, 432, or 532 present on the respective plate 130, 230, 330, 430, or 530. Each rocker 153, 253, 353, 453, or 553 is housed in a respective cavity 142, 242, 342, 442, or 552 formed in the respective cover 140, 240, 340, 440, or 540.

The rocker rod 154 is a master rocker rod, and includes at its end remote from its end connected to the second end 1531 of the rocker 153, a cam follower 1540 having the other rocker rods 254, 354, 454, and 554 mounted in hinged manner thereon. The cam follower 1540 is mounted on a cam 6120 present on the shaft 610, a rolling bearing 1541 being interposed between the cam 6120 and the cam follower 1540.

The shaft portion including the crankshaft 611 and the cam 6120 is enclosed in the engine casing 601 that is made up of an enclosure 6012, a cover 6010, and a bottom 6015. The enclosure 6012 has first openings 6013 for passing the rocker rods 154, 254, 354, 454, and 554, and second openings 6014 for passing the connecting rods 112, 212, 312, 412, and 512. The casing bottom 6015 includes a recess 6016 forming a bearing for supporting the end 610a of the central shaft 610 via a rolling bearing 6017. The cover 6010 has a central opening 6011 for passing the other end 601b of the shaft 610, the shaft being supported in the opening 6011 by a rolling bearing 6018.

Figure 3:
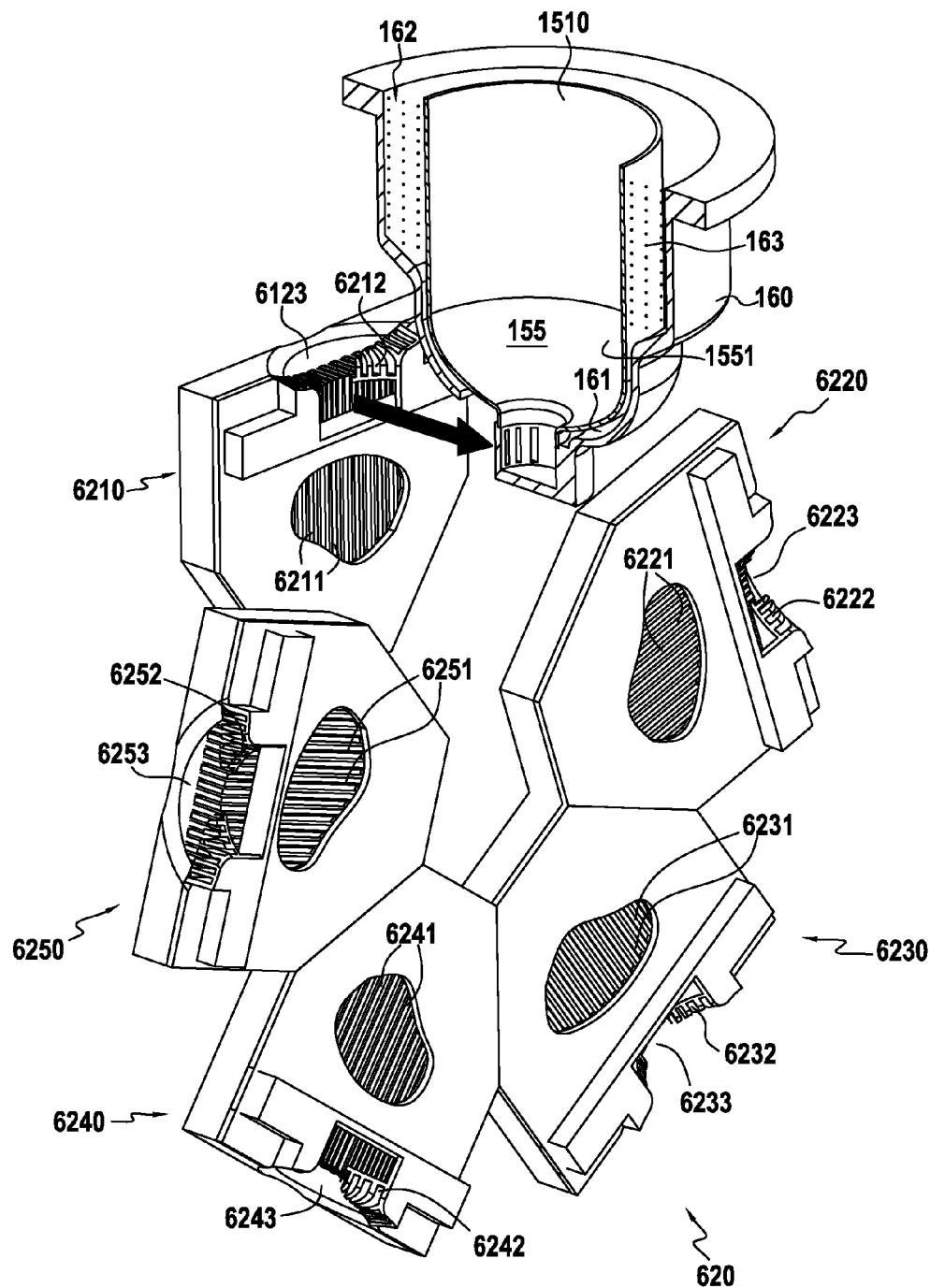
FIG. 3 is a perspective view on a larger scale of the solar fluid heater device shown in FIGS. 2A and 2B.
Figure 5A:
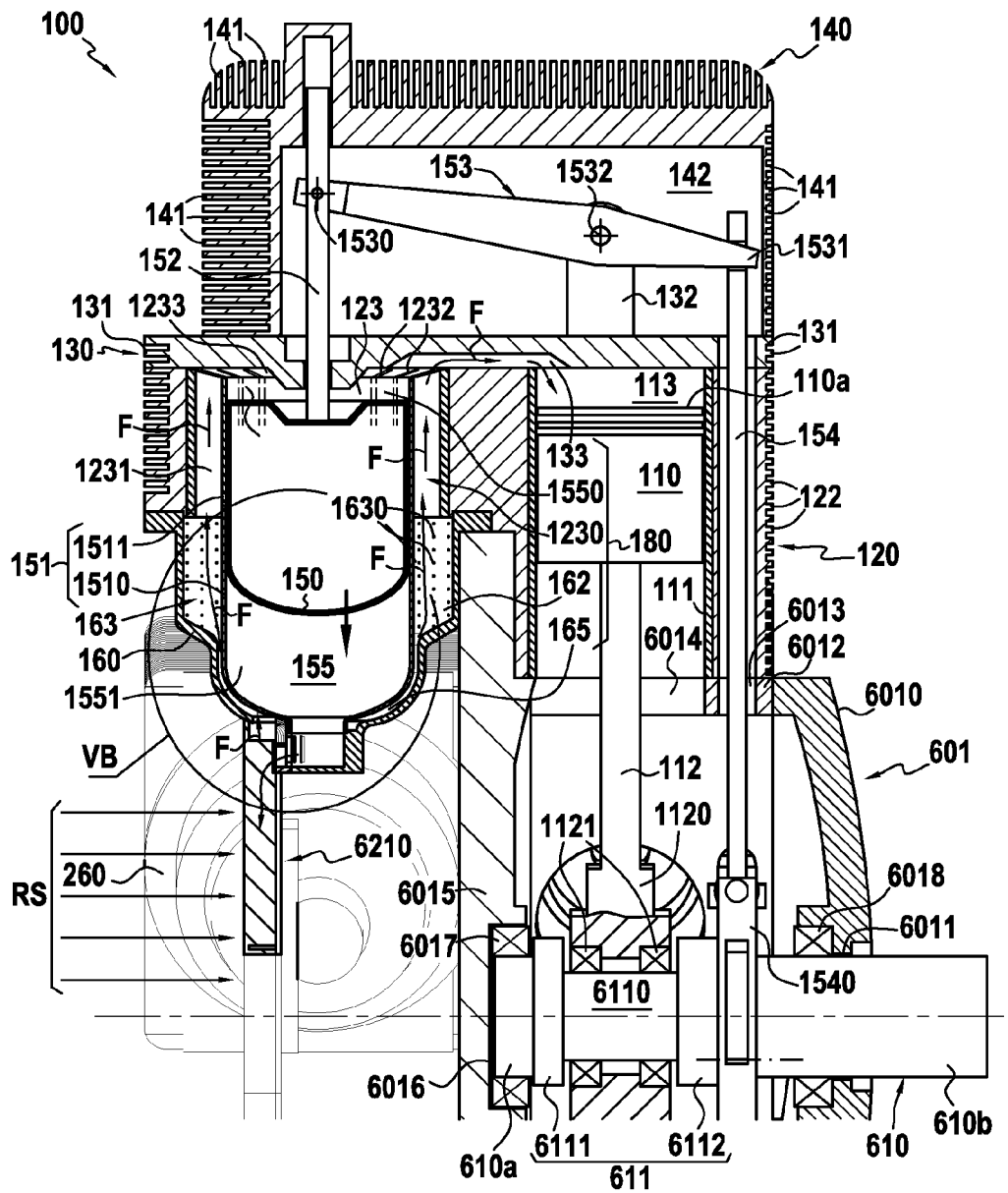
FIG. 5A is a section view of an actuator module of the FIG. 1 engine.
Figure 11:
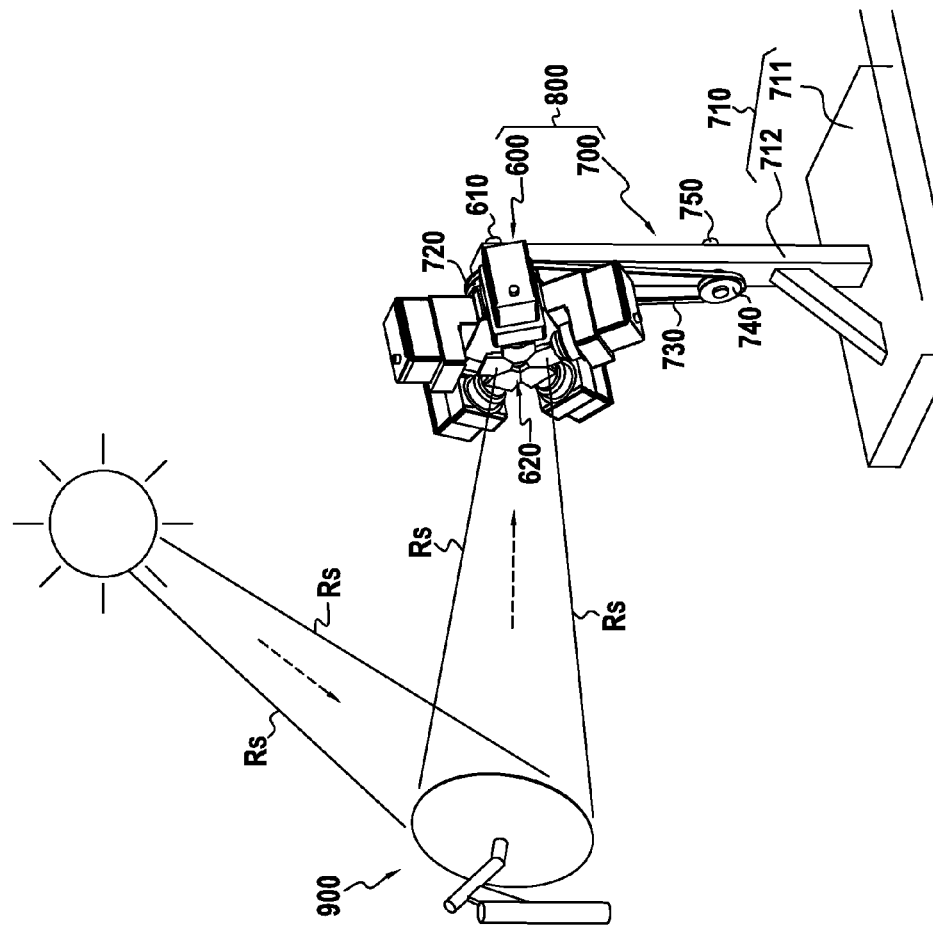
FIG. 11 shows the FIG. 10 system when the engine is subjected to solar radiation.

As shown in FIG. 3, the heater device 620 is made up of a plurality of collector unit, there being five collector unit 6210, 6220, 6230, 6240, and 6250 in this example, each associated with a respective actuator module 100, 200, 300, 400, and 500. Each unit 6210, 6220, 6230, 6240, and 6250 houses a respective array of channels 6211, 6221, 6231, 6241, or 6251 that extends between a respective inlet 6212, 6222, 6232, 6242, or 6252 and a respective outlet 6213, 6223, 6233, 6243, or 6253. In the presently-described embodiment, the heater device 620 is for exposure to solar radiation $R_S$ that heats the fluid present in each of the units 6210, 6220, 6230, 6240, and 6250 (FIG. 5A). By way of example, solar radiation may be concentrated on each of the units of the heater device by a parabolic mirror arranged relative to the engine 600 in such a manner as to cause the focus of the mirror to correspond to the position of the heater device 620 (FIG. 11). The fluid expansion engine may nevertheless make use of sources of heat other than solar radiation. The heater device 620 may be associated in particular with heater means, e.g. an electrical device or a device burning fuel (gas or liquid), suitable for transmitting heat to the unit of the heater device 620 in order to heat the fluid present therein.

FIG. 5A shows the internal structure of the actuator module 100. The drive piston 110 is housed in the jacket 111 that forms an enclosure defining a working chamber 113 of volume between the end 110a of the drive piston 110 and the plate 130 that is variable as a function of the position of the drive piston 110. Likewise, the displacement piston 150 is movable in an enclosure 155 defined by the jacket 151, the displacement piston subdividing this enclosure into a low temperature chamber 1150 and a high temperature chamber 1151. The volumes of the two chambers 1150 and 1151 vary as a function of the displacement piston.

Figure 5B:
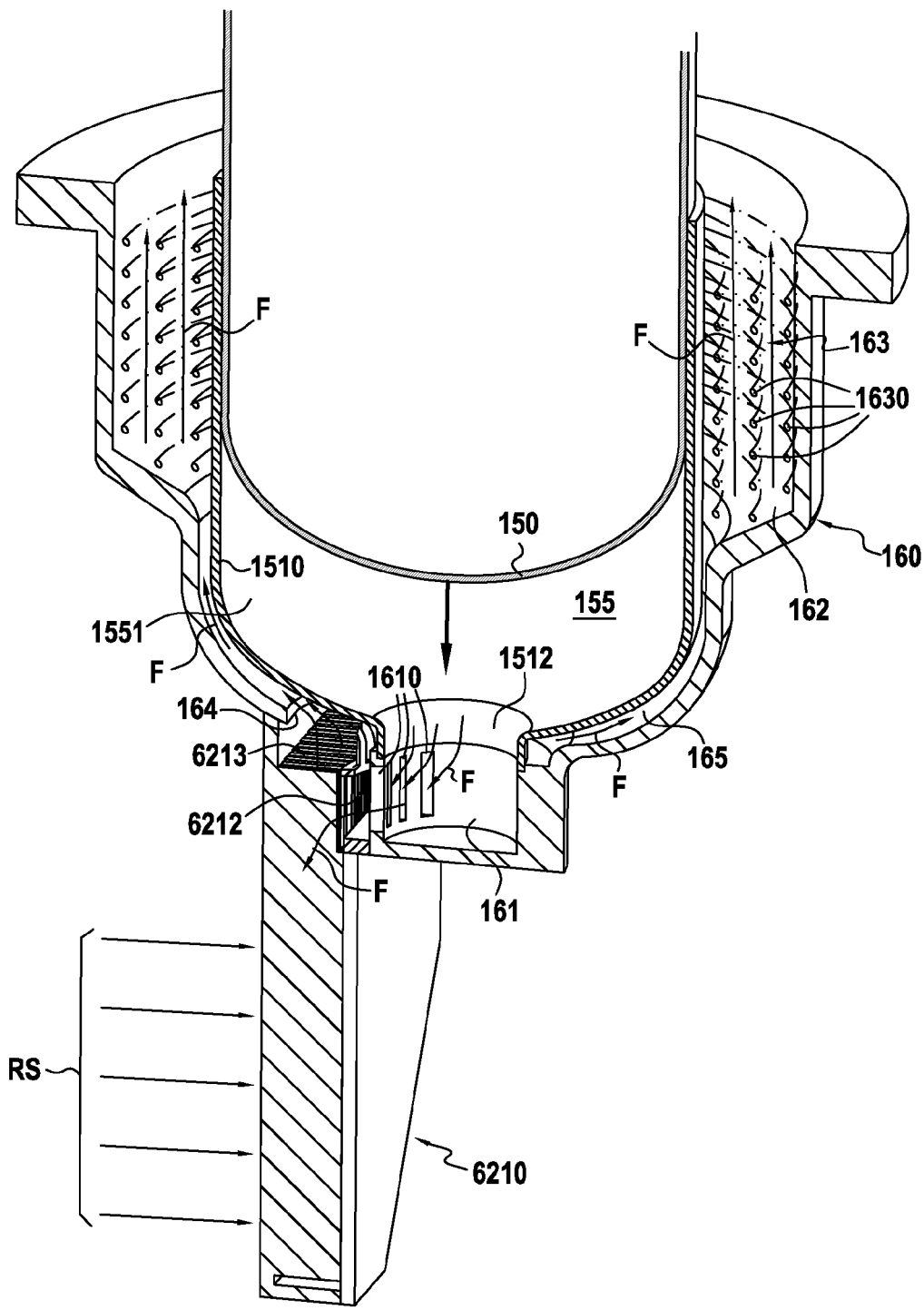
FIG. 5B is a detail view of a portion of the FIG. 5A actuator module.

As shown in FIG. 5B, the bottom of the element 1510 of the jacket 151 includes an opening 1512 leading to the bottom 161 of the cylindrical casing 160, the bottom 161 including openings 1610 co-operating with the inlet 6212 of the unit 6210 of the heater device 620 that receives solar radiation $R_S$. The cylindrical casing 160 also includes an opening 164 co-operating with the outlet 6213 of the unit 6210 of the solar heater device 620.

The actuator module 100 includes a closed fluid circulation circuit 180 formed between the unit 6210 and the working chamber 113, this circuit being formed by a circular gap 165 corresponding to clearance between the element 1510 of the jacket 151 and the casing 160, a cylindrical enclosure 162 also lying between the element 1510 of the jacket 151 and the casing 160, the cooler device 1230, the low temperature chamber 1550, a recess 133 formed in the plate 130, and the high temperature chamber 1551. The internal volume of the actuator module, as constituted by the unit 6210, the working chamber 113, and the fluid circulation circuit 180 is filled with a gaseous fluid that expands when its temperature is raised, i.e. a fluid having a high coefficient of thermal expansion. Such a fluid may be selected in particular from the following fluids: air, hydrogen, Freon, and helium. Any other fluid having the ability to expand sufficiently to drive each actuator module may be used in the engine of the invention. Each actuator module includes at least one valve for emptying and filling each circulation circuit with the desired fluid (not shown in the figures).

The drive piston 110 and the displacement piston 150 are arranged in adjacent manner in a common plane parallel to the axis of the central shaft in particular by using the rocker 153 placed above the drive piston 110 that serves to place the control rod 152 and the rocker rod 154 as close as possible to the drive piston and in the same plane as the drive piston. By virtue of this arrangement, it is possible to minimize the overall size of each actuator module and thus make the engine more compact.

FIGS. 5A and 5B show the actuator module 100 with the fluid F flowing from the outlet 6213 of the unit 6210 in which it is heated to the working chamber 113. More precisely, under the effect of its own expansion and/or of the downward movement of the displacement piston 150, the fluid F flows initially on leaving the unit 6210 through a circular gap 165 corresponding to clearance between the element 1510 of the jacket 151 and the casing 160 (FIG. 5B). The fluid F then reaches the cylindrical enclosure 162. In the presently-described embodiment, the cylindrical enclosure 162 contains a gas regenerator 163 corresponding to a material having good heat capacity, such as copper wires 1630, for example. Under such circumstances, a large portion of the heat energy in the fluid F is taken up by the regenerator 163. The cooled fluid F then flows through the grooves 1232 situated between the fins 1231 of the cooler device 1230 surrounding the housing 123 of the cylinder block 120 so as to reach an annular gap 1233 formed between the top of the cooler device 1230 and the plate 130, the annular gap 1233 communicating both with the low temperature chamber 1550 and with the recess 133 and extending between the low temperature chamber 1150 and the working chamber 113. The fluid F can thus reach the working chamber 113 by passing via the recess 133.

During stages of the thermodynamic cycle of the actuator module corresponding to a reduction in the volume of fluid F and to the drive piston 110 rising, the fluid F flows from the working chamber 113 to the unit 6210 by passing respectively via the recess 133, the cooler device 1230, the regenerator 163, the circular gap 165, and the outlet 6213 of the unit 6210. While the displacement piston 150 is rising, a portion of the fluid F present in the low temperature chamber is taken into the unit 6210 following the same path.

Figure 4B:
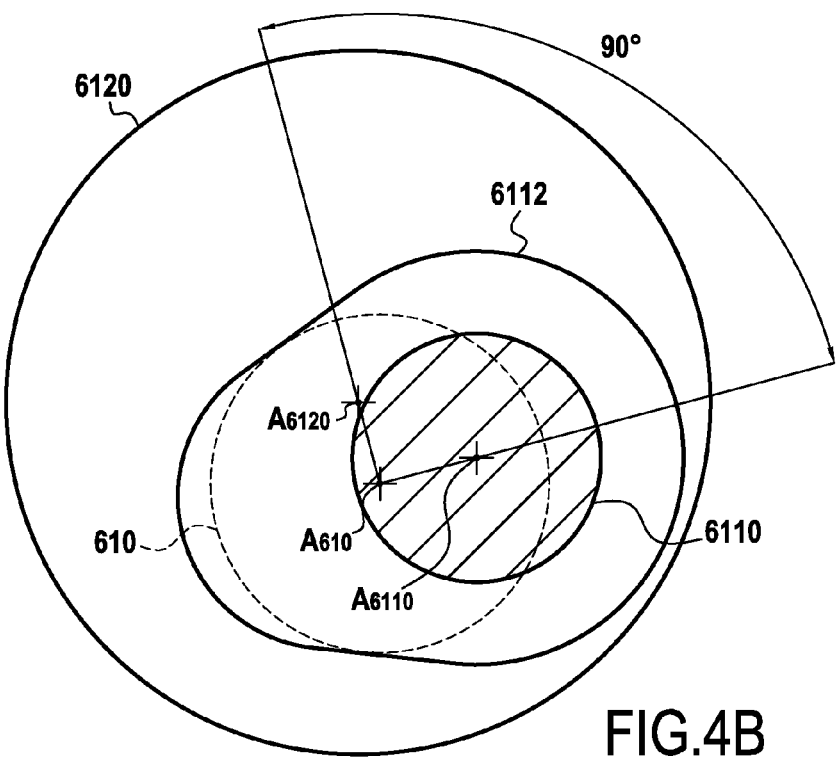

As described above, the drive piston 110 is connected to the crankpin 6110 secured to the shaft 610 via its connecting rod 112, while the displacement piston is connected to the cam 6120 also secured to the shaft 610 by the control rod 152, the rocker 153, and the rocker rod 154. As shown in FIGS. 4A and 4B, the crankpin 6110 revolves about its axis $A_{6110}$ while the cam 6120 revolves around its axis $A_{6120}$, the axes $A_{6110}$ and $A_{6120}$ being in off-center positions relative to the axis $A_{610}$ of the shaft 610. In addition, the axes $A_{6110}$ and $A_{6120}$ are placed in respective positions relative to the axis $A_{610}$ that form an angle of 90° relative to the axis $A_{610}$. The axes $A_{6110}$ and $A_{6120}$ thus revolve around the axis $A_{610}$ with an angular phase offset of 90° such that the movement of the drive piston 110 presents a phase lag of 90° relative of the movement of the displacement piston 150.

The structure and the operation of the actuator modules 200, 300, 400, and 500 are identical to those described above for the actuator module 100 and are not described again for simplification purposes. The actuator modules 200, 300, 400, and 500 differ from the actuator module 100 merely in that the connecting rods 212, 312, 412, and 512 of the drive pistons 210, 310, 410, and 510, and the rocker rods 254, 354, 454, and 554 of the displacement piston 250, 350, 450, and 550 are respectively follower connecting rods and control rods, whereas the connecting rod 112 and the control rod 154 of the actuator module 100 are respectively a master connecting rod and a master control rod.

There follows a description of the operation of the engine 600 over one revolution (360°), i.e. the positions of the engine 600 and the positions of the elements of the actuator module 100 respectively at the beginning of the revolution (0°), after one-fourth of a revolution (90°), after half of a revolution (180°), after three-fourths of a revolution (270°), and after one complete revolution (360°).

Figure 6A:
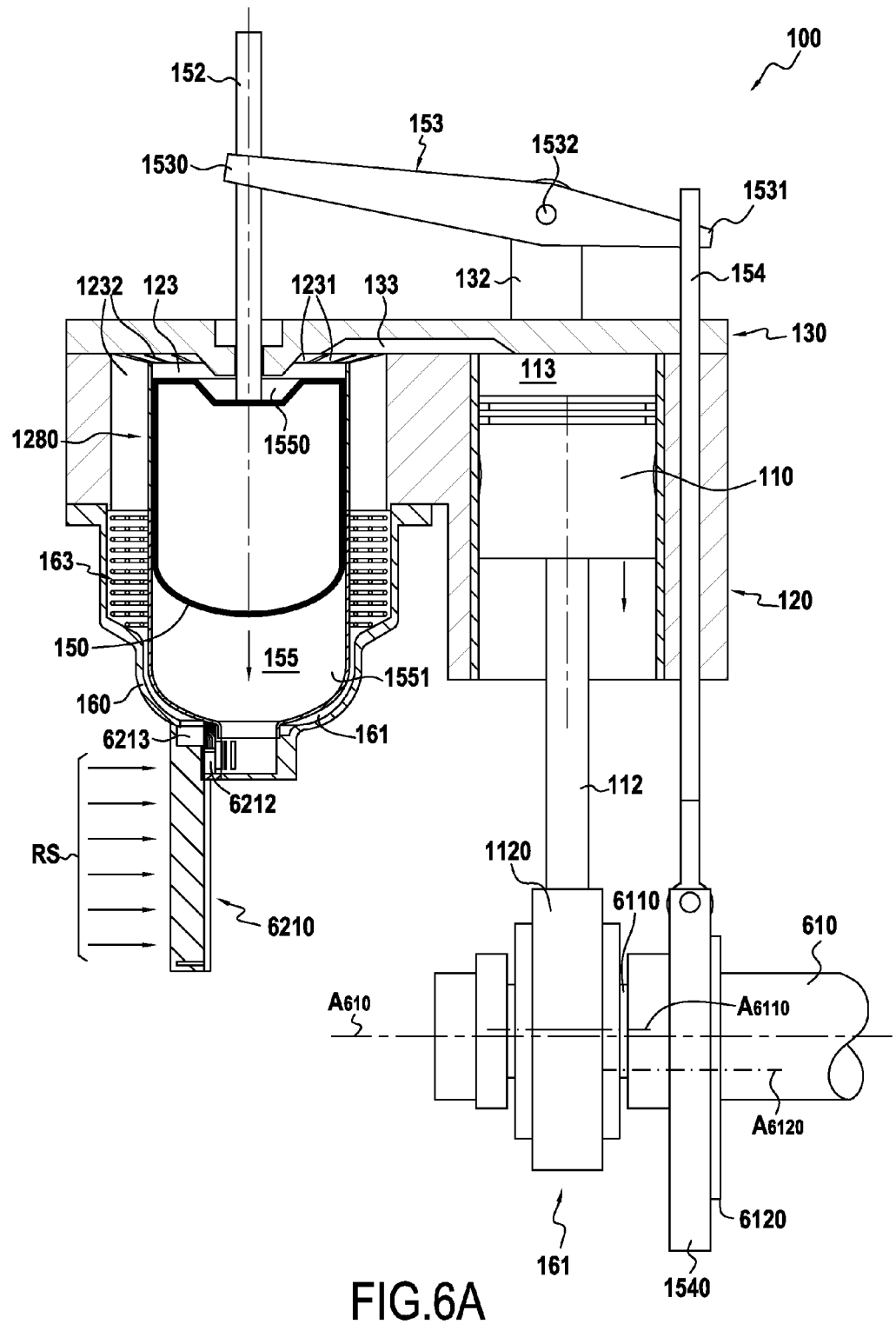
FIGS. 6A to 6C, 7A to 7C, 8A to 8C, and 9A to 9C show the operation of the FIG. 1 engine over one revolution.
Figure 6B:
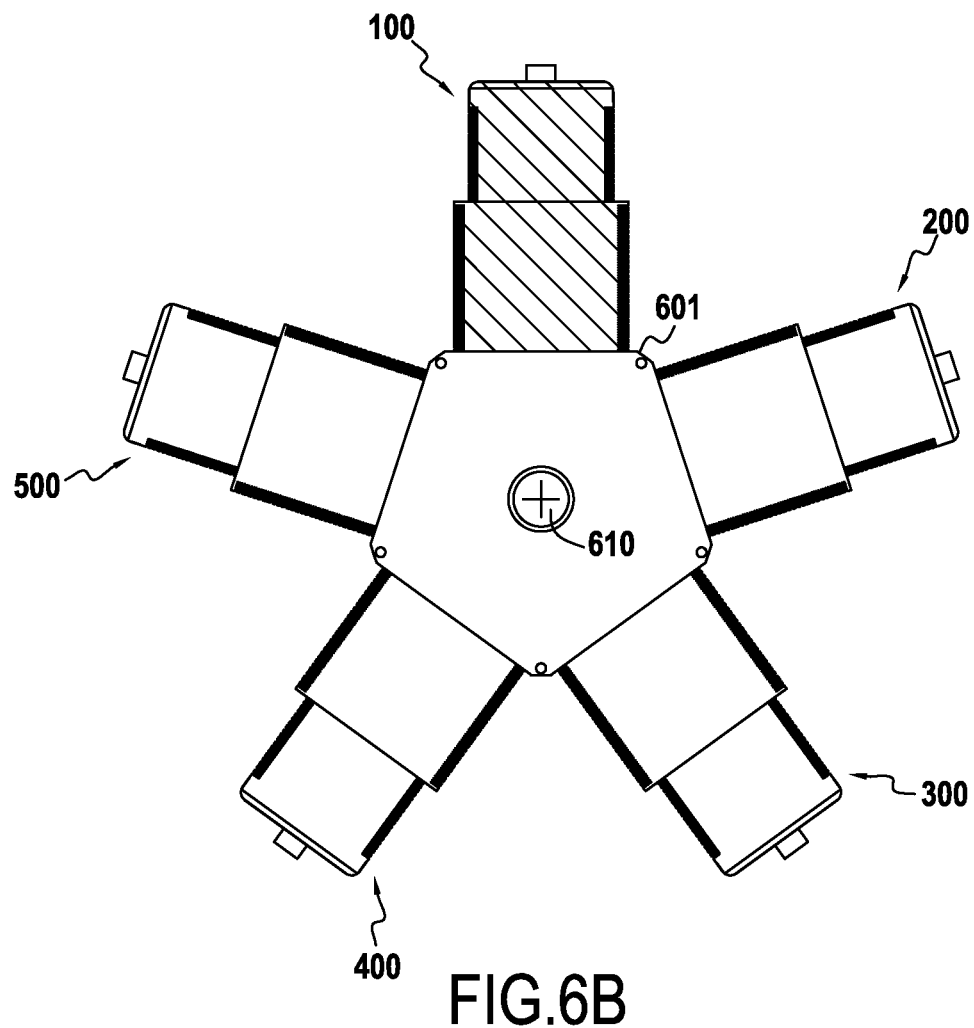
Figure 6C:
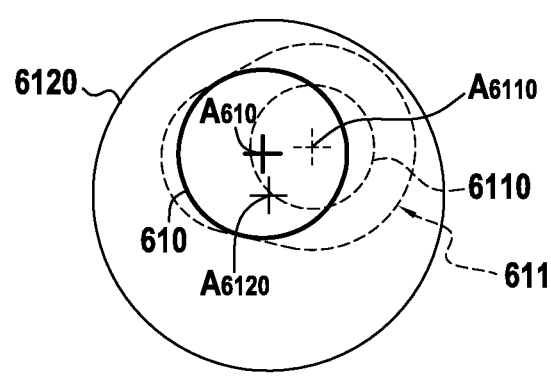

At the start of the revolution (FIGS. 6A, 6B, and 6C) the displacement piston 150 is in its maximally high position immediately before beginning its downward movement, such that the majority of the gas is present under its displacement piston, i.e. in the high temperature chamber 1551 that is in communication with the inlet 6212 of the unit 6210. In this phase of rotation, which corresponds to the constant-volume stage of heating in the thermodynamic cycle of the actuator module, the temperature and the pressure of the fluid present in the actuator module 100 increase, while its volume remains relatively constant.

The constant-volume stage of heating is followed by the isothermal expansion stage. The fluid present in particular in the unit 6210 then expands under the effect of the heat it receives and it leaves the unit via the outlet 6213. The gas passes through the regenerator 163 where it transfers a very large part of its heat. The fluid continues to travel through the cooler device 1230 and reaches the working chamber 113. The pressure of the fluid decreases while its volume increases, in particular in the working chamber 113, thereby developing a thrust force on the drive piston 110 that begins a downward movement at the same time as the displacement piston begins to move down. The connecting rod 112 of the drive piston 110 then exerts at thrust force on the crankpin 6110 via its head 1120. This thrust contributes to setting the engine 600 into rotation.

After one-fourth of a revolution (FIGS. 7A, 7B, and 7C), the displacement piston 150 is in an intermediate position in which the fluid is present both in the low temperature chamber 1550 and in the high temperature chamber 1551. The temperature of the fluid is relatively constant while its pressure decreases. The drive piston 110 also continues to move downwards.

The isothermal expansion stage is then followed by a stage of constant-volume cooling of the fluid in the actuator module, which corresponds to a drop in the pressure and the temperature of the fluid.

Figure 8A:
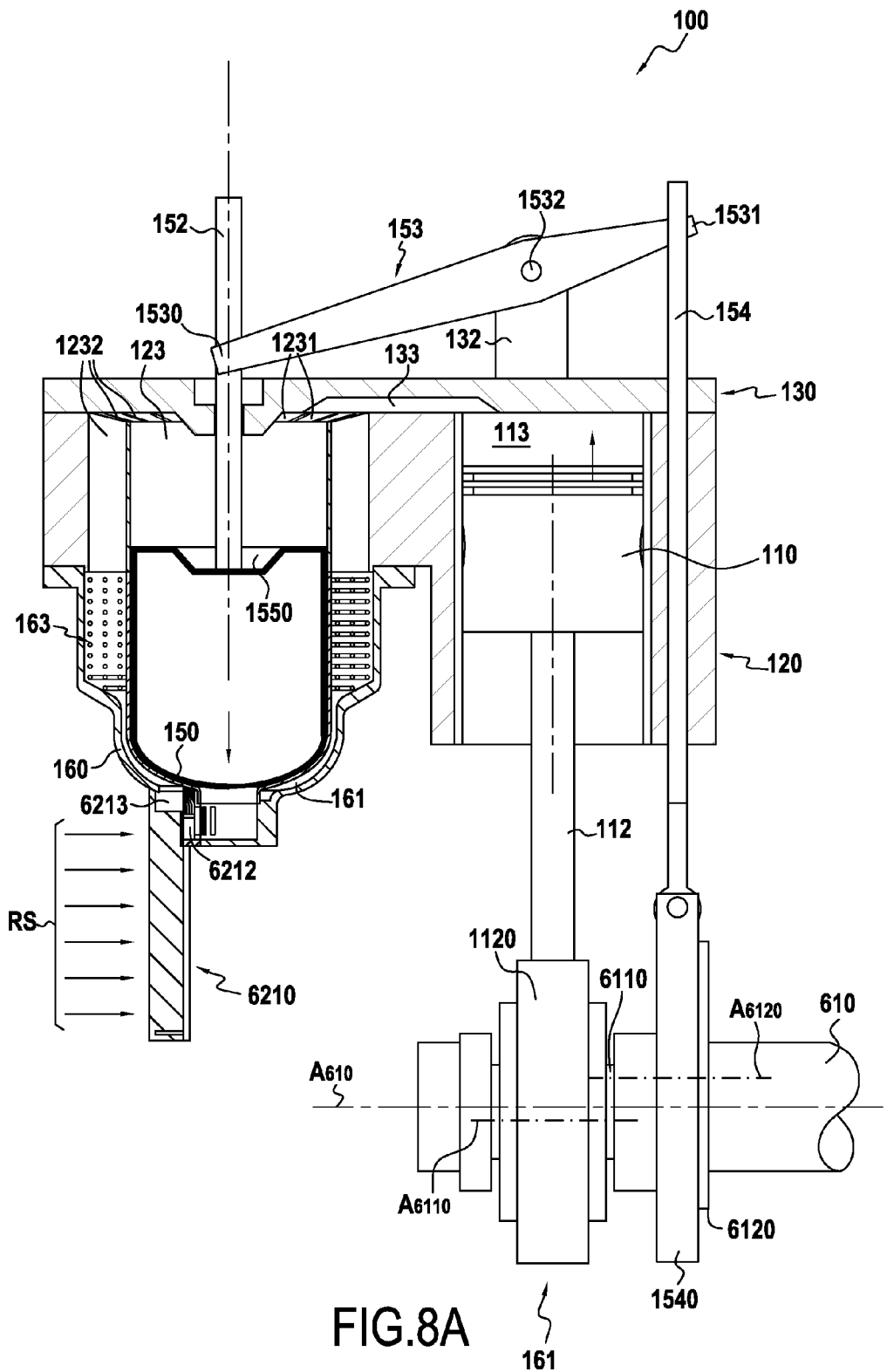
Figure 8B:
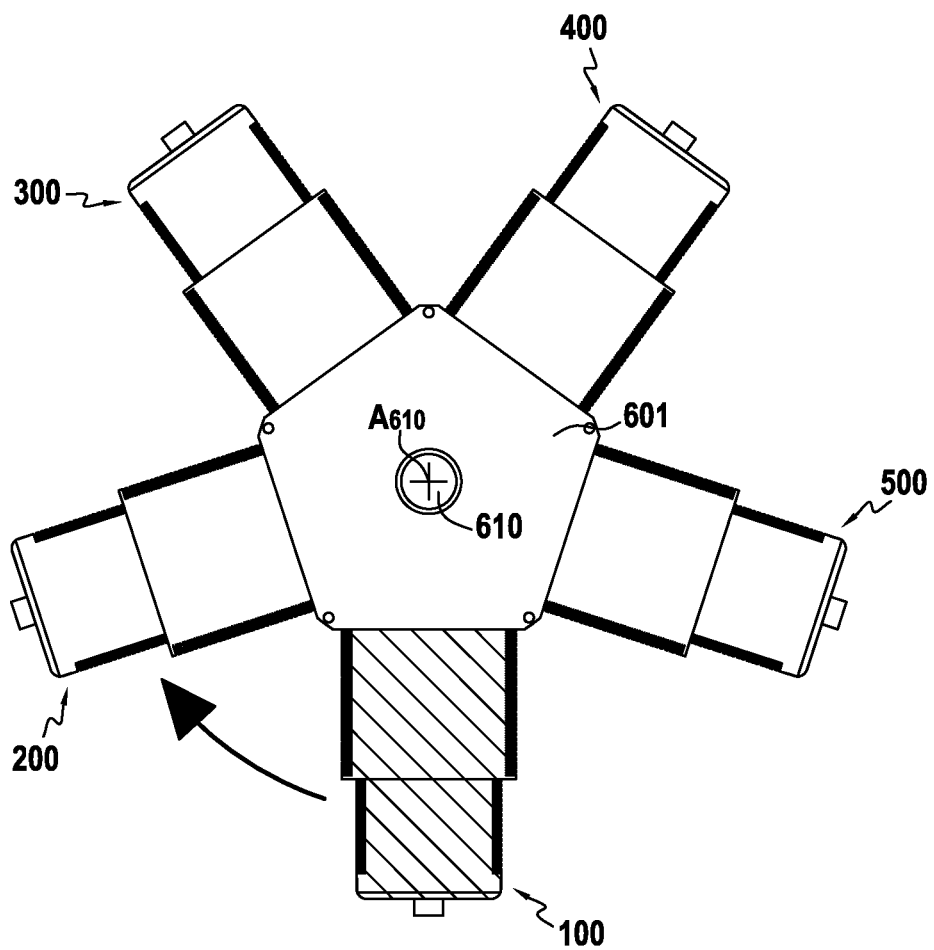
Figure 8C:
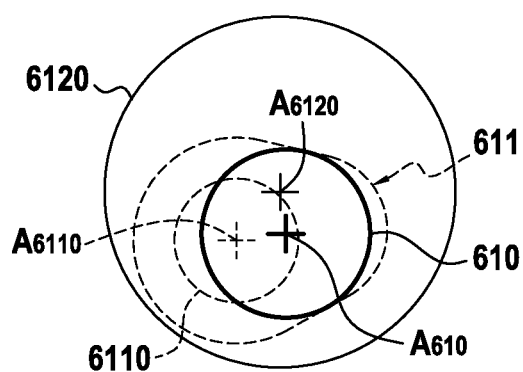

After half of a revolution (FIGS. 8A, 8B, and 8C), the displacement piston 150 is in its lowest position. The majority of the gas has passed through the regenerator 163 and is in the low temperature chamber 1550 and in the working chamber 113. The drive piston 110 is then moving upwards. At this stage, the temperature and the pressure of the gas in the actuator module 100 are at a minimum.

The constant-volume cooling stage is followed by an isothermal compression stage in which the pressure of the fluid increases while its volume decreases.

Figure 9A:
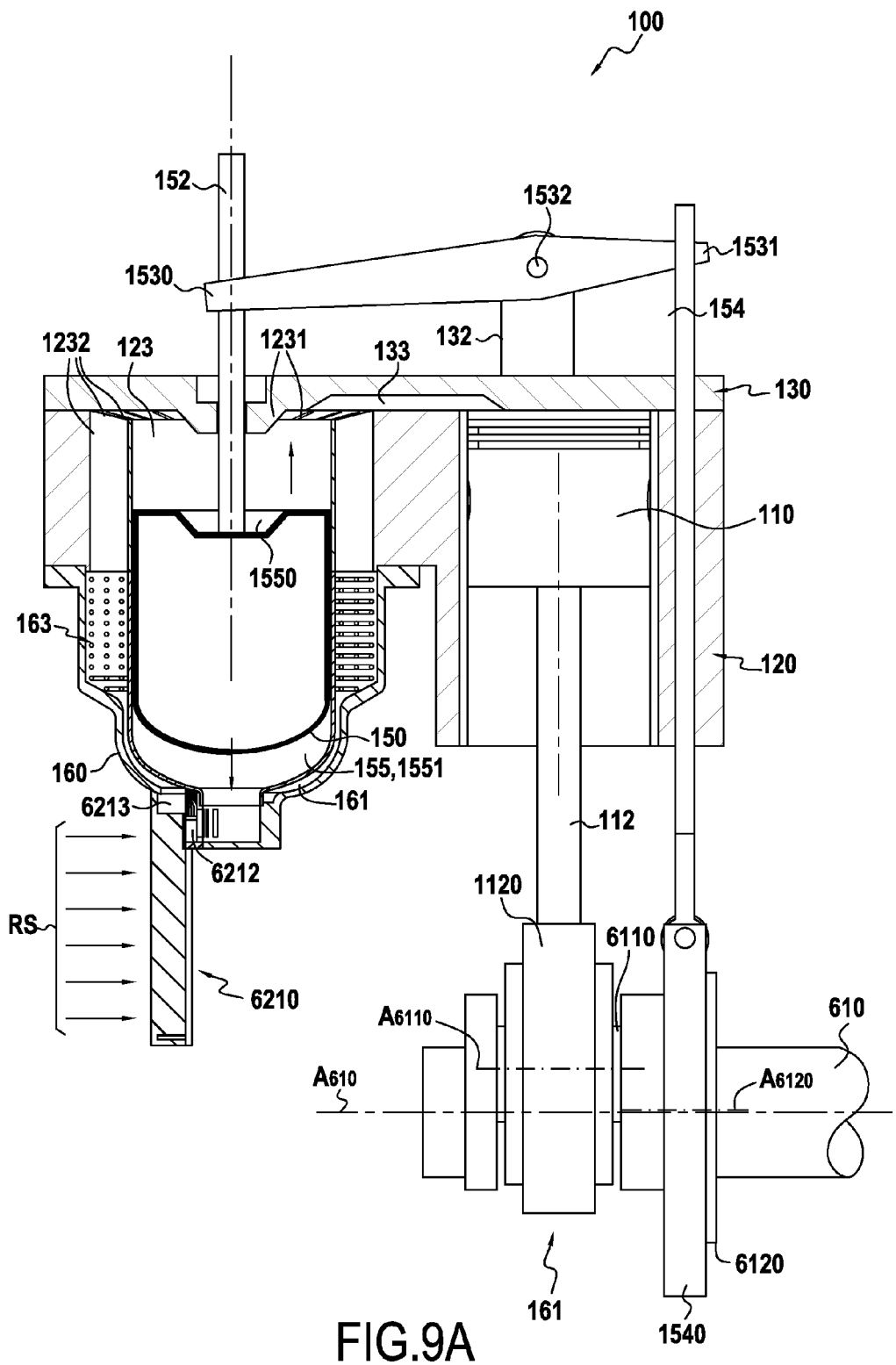
Figure 9B:
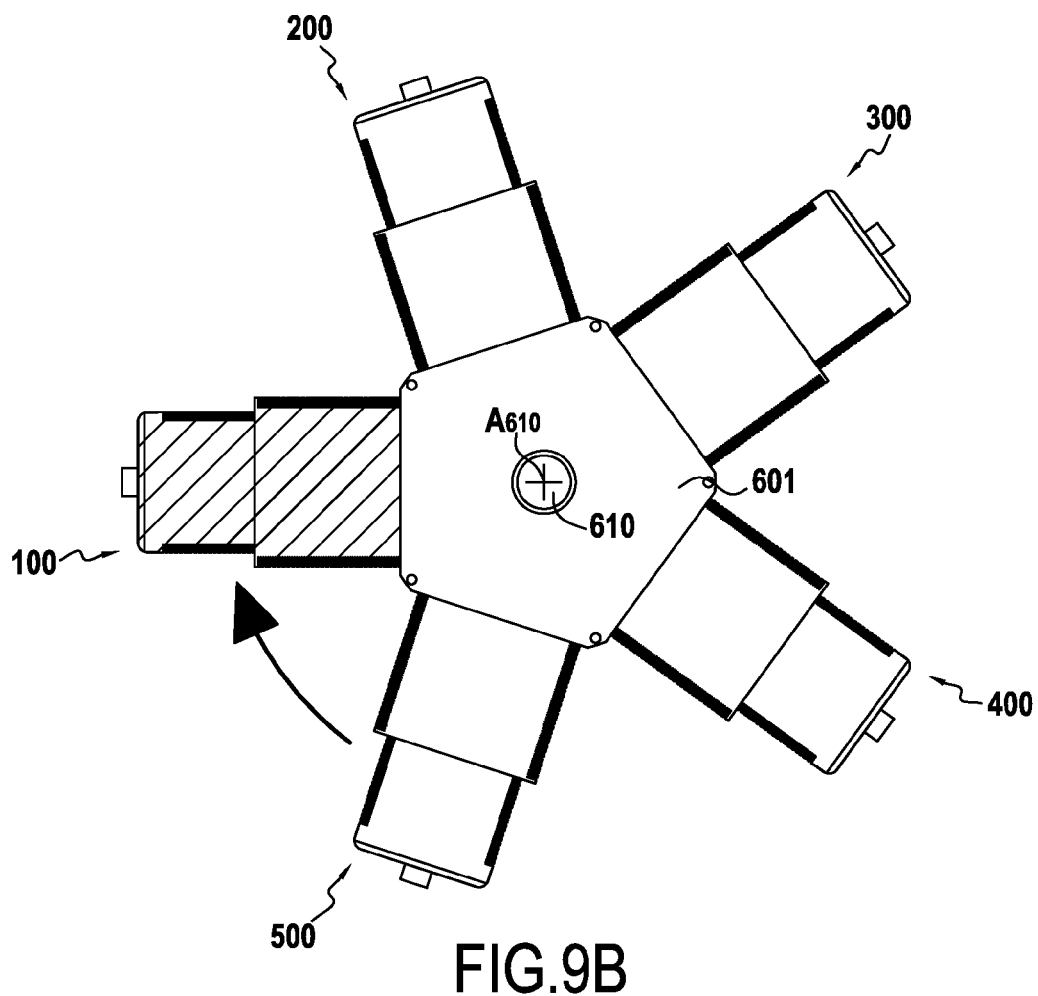
Figure 9C:
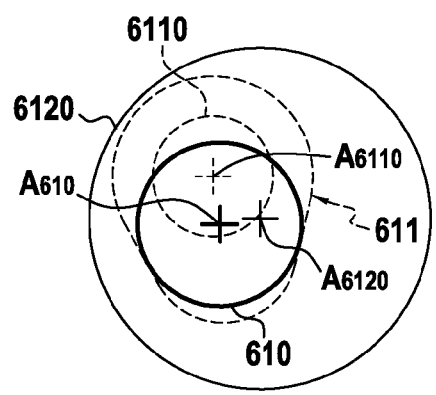

After three-fourths of a revolution (FIGS. 9A, 9B, and 9C), the drive piston 110 is in its highest position, while the displacement piston 150 is moving upwards, thereby causing the fluid situated in the low temperature chamber 1550 to move through the cooler device 1230 and above all through the regenerator 163 that restores to the gas the heat that was previously taken therefrom. The gas continues its movement towards the unit 6210 and the high temperature chamber.

Figure 7A:
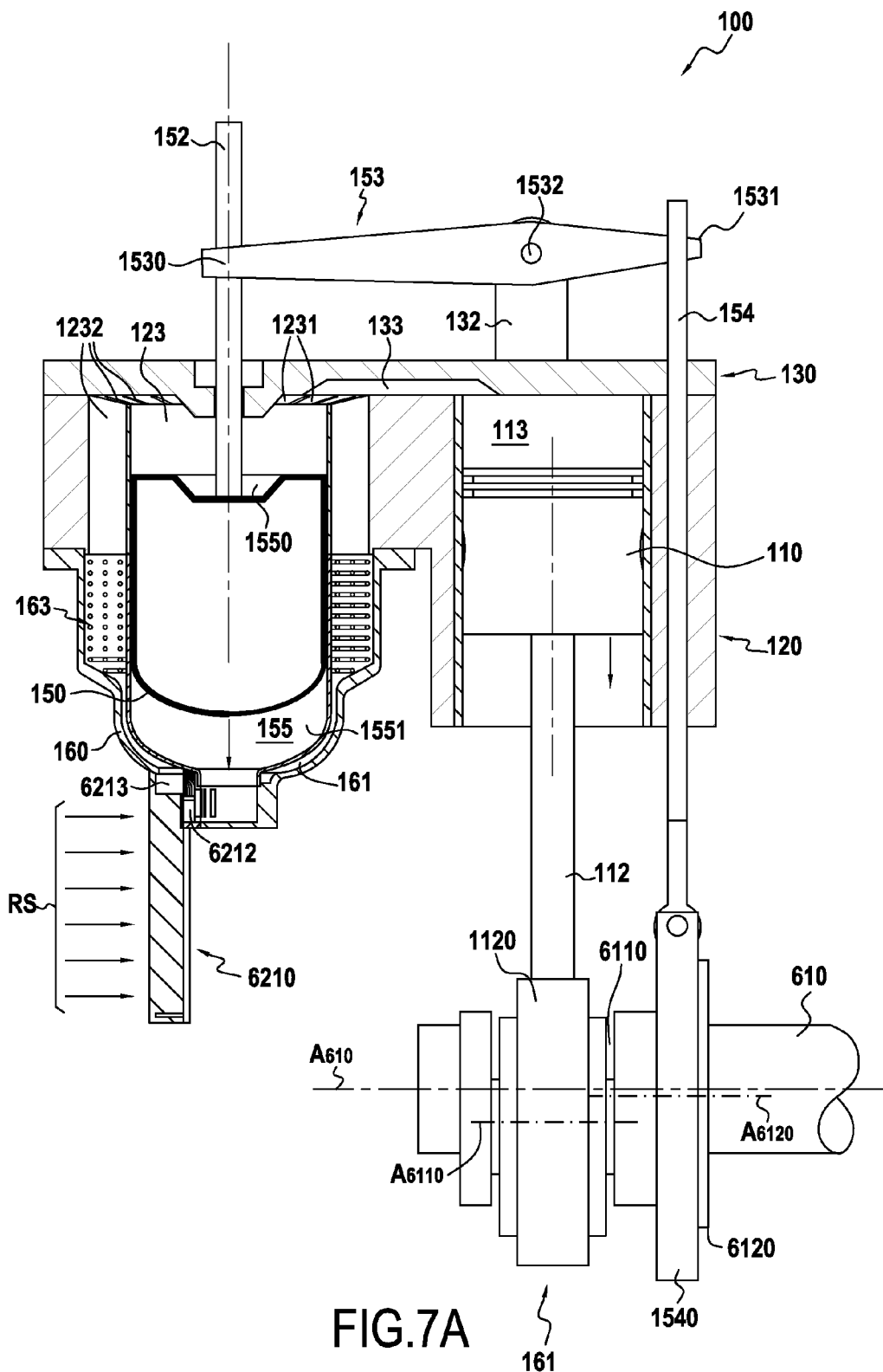
Figure 7B:
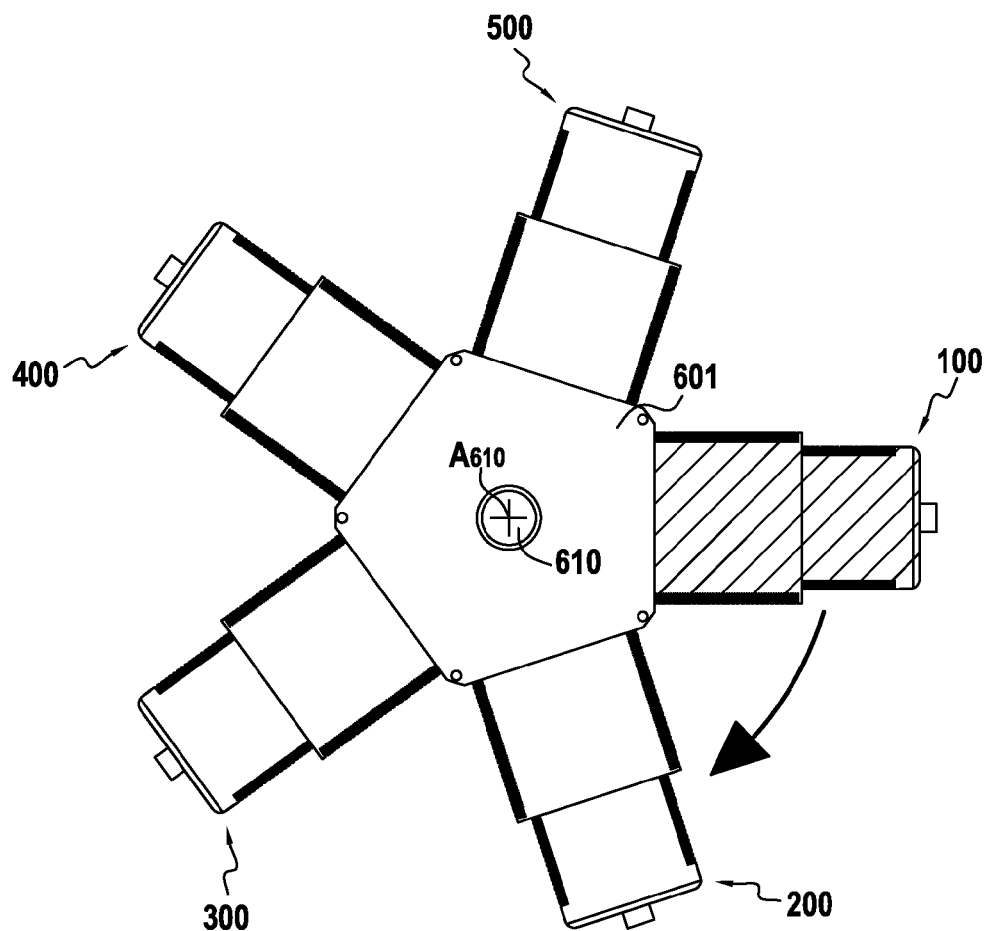
Figure 7C:
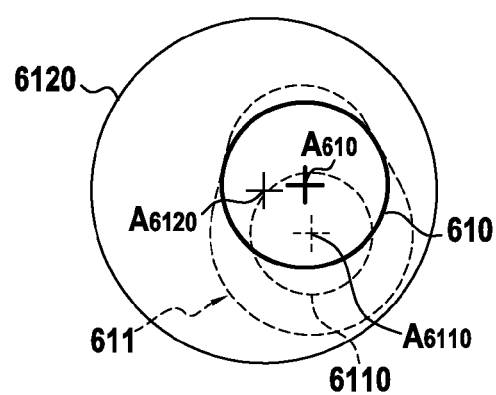

After one complete revolution, the engine 600 and the actuator module are back in the configuration shown in FIGS. 7A, 7B, and 7C, as described above.

The engine of the invention pollutes very little since it does not use internal or external combustion means for drive purposes and it therefore does not exhaust any combustion gas. The engine of the invention also requires little maintenance and its operation is very silent.

In addition, each actuator module and consequently the engine as a whole presents a structure that is compact, in particular because of the presence of a fluid circulation circuit connecting the solar heater device to the working chamber of the drive piston.

Furthermore, in the engine of the invention, each actuator module that operates on the principle of the Stirling engine, rotates continuously about the central shaft, thereby enabling natural ventilation to be established, in particular over the outside wall of the working chamber of the drive piston, and consequently accelerating the cooling of the fluid at the end of the thermodynamic cycle. This further improves the efficiency of the engine.

Figure 10:
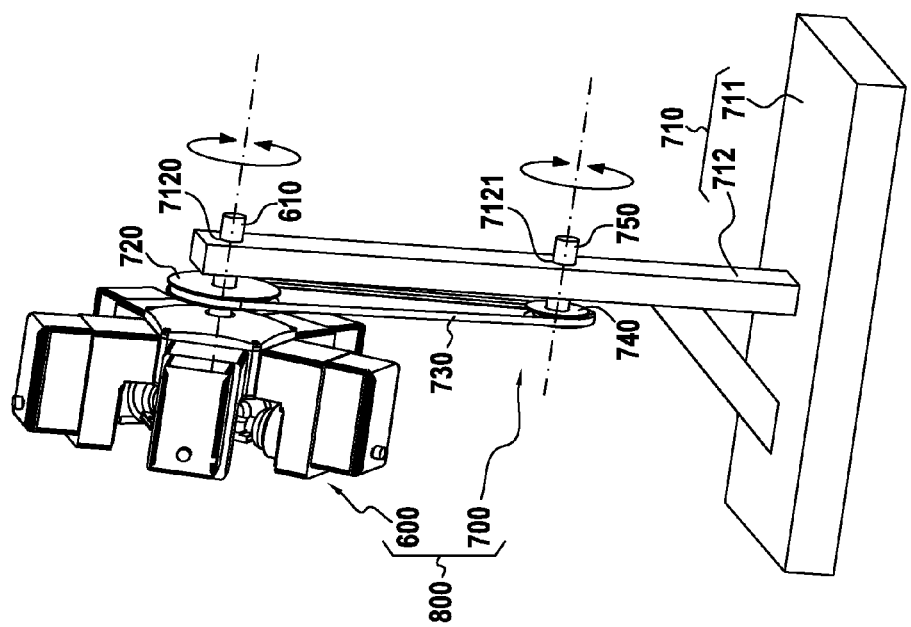
FIG. 10 shows a system using the FIG. 1 engine for recovering the energy produced by the engine.

FIG. 10 shows a system 800 made up of a support device 700 having mounted thereon the fluid expansion engine 600 as described in detail above. The support device 700 comprises a structure 710 with a base 711 for placing or fastening on the ground or on a support, and a pole 712 connected to the base 711. The pole 712 has a first bearing 7120 carrying the free end of the central shaft 610 of the engine 600 and a second bearing 7121 carrying a power take-off shaft 750. The shaft 750 is driven in rotation by the engine 600 by means of a belt 750 connecting a wheel 720 mounted on the shaft 610 of the engine 600 to a wheel 740 mounted on the shaft 750. The power taken off in this way by the shaft 750 in the form of rotary motion can be used directly in mechanical form by connecting the shaft 740 to a mechanical device (not shown in FIG. 10), e.g. a pumping system, or else in electrical form by connecting the shaft 740 to an alternator (not shown in FIG. 10), and possibly to batteries for storing electrical energy. Naturally, any other system for generating electricity or heat could be associated with the system 800.

In FIG. 11, the system 800 is used with a parabolic mirror 900 that serves to concentrate solar radiation $R_S$ onto the unit of the solar heater device 620 of the engine 600. For this purpose, the mirror 900 is positioned and movable relative to the engine 600 so that its focus corresponds to the position of the solar heater device 620.

The invention claimed is:

1. A hot fluid expansion engine comprising a central shaft and a plurality of actuator modules arranged in a star configuration around the central shaft, each module comprising:
   a drive piston movable in a first enclosure, the drive piston defining a working chamber of variable volume in said first enclosure; and
   a displacement piston movable in a second enclosure, the displacement piston separating a low temperature chamber of variable volume from a high temperature chamber of variable volume in said second enclosure, the low temperature chamber communicating with the working chamber;
   the drive piston and the displacement piston of each actuator module being connected to the central shaft via respective first and second eccentric transmissions, each of the first eccentric transmission and the second eccentric transmission being configured to cause the corresponding piston to perform reciprocating motion in translation, the motion of the drive piston having a phase lag of 90° relative to the motion of the displacement piston, each module being driven in rotation about the central shaft so as to accelerate the cooling of a fluid in the working chamber;
   the engine further including a fluid heater placed between the actuator modules, each high temperature chamber communicating with the fluid heater and each working chamber being connected to said fluid heater via a fluid circulation circuit, and the fluid circulation circuit of each actuator module includes a gas regenerator extending around the high temperature chamber.

2. The engine according to claim 1, wherein each actuator module comprises a cylinder block having an internal housing corresponding to the working chamber, said cylinder block having cooling fins on its outside surface.

3. The engine according to claim 1, wherein the fluid circulation circuit of each actuator module comprises a heat dissipater extending around the low temperature chamber.

4. The engine according to claim 1, wherein the fluid heater comprises a plurality of collector units each enclosing an array of channels extending between an inlet and an outlet, the inlet of each unit being connected to the high temperature chamber of a corresponding actuator module, and the outlet of said unit being connected to the fluid circulation circuit of said corresponding actuator module.

5. The engine according to claim 1, including a solar radiation concentrator configured to concentrate solar rays on a collector unit of the fluid heater.

6. The engine according to claim 1, including a heater configured to transmit heat to a collector unit of the fluid heater.

7. The engine according to claim 1, wherein, in each actuator module the drive piston and the displacement piston are arranged in adjacent manner in a common plane perpendicular to the axis of the central shaft.

8. An engine according to claim 7, wherein each displacement piston is connected to a first end of a rocker via a guide rod, the second end of the rocker being connected to one end of a control rod, the opposite end of the control rod being connected to a cam follower mounted on a cam secured to the central shaft.

9. The engine according to claim 1, wherein each drive piston is connected to one end of a connecting rod, the opposite end of the connecting rod being connected to a head mounted on a crankpin of a crankshaft present on the central shaft.

10. The engine according to claim 1, wherein each actuator module contains a gaseous fluid selected from at least one of the following gaseous fluids: air, hydrogen, Freon, and helium.

11. The engine according to claim 1, wherein the cooling of the fluid in the working chamber is by ventilation over an outer wall of the working chamber.

12. The engine according to claim 1, further comprising a solar radiation concentrator configured to concentrate solar rays on a collector unit of the fluid heater, the solar radiation concentrator including a parabolic mirror.

13. The engine according to claim 1, wherein the drive piston of each of the actuator modules is connected to a crank pin that is secured to the central shaft by a connecting rod, and the displacement piston of each of the actuator modules is connected to a cam that is secured to the central shaft by a control rod.

14. The engine according to claim 13, wherein the crankpin revolves about its axis while the cam revolves around its axis, the axis of the crankpin and the axis of the cam are in off-center positions relative to an axis of the central shaft such that the motion of the drive piston presents a phase lag of 90° relative to the motion of the displacement piston.

15. The engine according to claim 1, further comprising a movable solar concentrator that concentrates solar rays onto one or more collector units of the fluid heater, wherein the solar concentrator is movable relative to the engine so that a focus of the solar concentrator may be adjusted to correspond to a position of the heater device.

* * * * *